US012427077B2

(12) United States Patent
Ronquillo

(10) Patent No.: US 12,427,077 B2
(45) Date of Patent: Sep. 30, 2025

(54) ADJUSTABLE ORTHOPEDIC SEAT PAD

(71) Applicant: Roberto Ronquillo, Quezon (PH)

(72) Inventor: Roberto Ronquillo, Quezon (PH)

( * ) Notice: Subject to any disclaimer, the term of this patent is extended or adjusted under 35 U.S.C. 154(b) by 0 days.

(21) Appl. No.: 18/267,033

(22) PCT Filed: Dec. 23, 2020

(86) PCT No.: PCT/PH2020/050019

§ 371 (c)(1),
(2) Date: Jun. 13, 2023

(87) PCT Pub. No.: WO2022/139606

PCT Pub. Date: Jun. 30, 2022

(65) Prior Publication Data

US 2024/0374450 A1 Nov. 14, 2024

(51) Int. Cl.
*A61G 15/00* (2006.01)
*A61G 15/12* (2006.01)

(52) U.S. Cl.
CPC ........... *A61G 15/12* (2013.01); *A61G 15/007* (2013.01)

(58) Field of Classification Search
CPC .. A61G 15/12; A61G 15/007; A61G 13/1245; A61G 13/125; A61G 13/129; A61G 13/123; A61G 5/124; A61G 5/1091; A61G 5/10; A61G 5/1043; A61G 5/1045; A61G 7/109; A61G 13/1285; A61F 5/0093; A47C 7/029; A47C 7/021; A47C 7/024; A47C 7/0213; A47C 13/0001; A47G 9/10–109; A61B 5/055
USPC ........................................................ 128/845
See application file for complete search history.

(56) References Cited

U.S. PATENT DOCUMENTS 2,156,629 A * 5/1939 Miller .................. A47C 7/0213
5/652
2,855,986 A * 10/1958 Engelen, Sr. .......... B60N 2/646
297/452.32
4,190,918 A * 3/1980 Harvell .................... A47C 4/52
D6/601
4,345,345 A * 8/1982 Holtz ..................... A44B 99/00
5/640
4,643,481 A * 2/1987 Saloff ................ A61G 7/05715
297/DIG. 2
5,452,940 A * 9/1995 Maier .................... A47C 7/029
297/452.32
5,572,757 A * 11/1996 O'Sullivan .............. A47C 7/46
5/636

* cited by examiner

*Primary Examiner* — Adam Baker
(74) *Attorney, Agent, or Firm* — Gloria Tsui-Yip; Gottlieb, Rackman & Reisman, P.C.

(57) ABSTRACT

An adjustable orthopedic seat pad for use of persons afflicted with neurological painful conditions namely sciatica, ischial bursitis, pirifomis syndrome, coccydynia and nerve impairments in the perineum area during sitting, with said adjustable seat pad comprising a pair of opposing cushion pads, and a plurality of elastic straps spacedly connecting the adjacent portions of said pair of cushion pads, characterized in that said pair of cushion pads having elongated raised portions with predetermined thickness disposed longitudinally on the upper distal ends thereof, and a space being provided in between the rear portions of said pair of cushion.

7 Claims, 3 Drawing Sheets

ADJUSTABLE ORTHOPEDIC SEAT PAD

TECHNICAL FIELD

The present invention relates generally to the field of seat pads, and more specifically to an adjustable orthopedic seat pad that allows persons afflicted with neurological painful conditions namely sciatica, ischial bursitis, pirifomis syndrome, coccydynia and nerve impairments in the perineum area to be able to sit more comfortably and withstand prolonged sitting.

BACKGROUND OF THE INVENTION

Many people resort to using seat cushions or seat pads which may come in fixed contoured forms with the expectation of having a more comfortable and improved seating experience. Seat cushions or seat pads can either be designed as a permanent fixture or component of a chair or be designed for portable use in a variety of seating situations, such as for example in different chairs, automotive seats, and wheelchairs.

Sitting is the basic resting positions of every human being. When a person is sitting down on any surface, the body weight is supported mainly by the buttocks which come in contact with a chair seat. Doctors always recommend to stand up and stretch frequently to avoid the discomforts and the ill effects on one's health associated with prolonged sitting. Prolonged sitting during daily activities like doing office work, driving, vehicle and airplane rides inevitably results in pain and numbness in the buttocks and back area. However, a more serious result of prolonged sitting is the compression of the nerves in highly sensitive areas such as the inguinal, perineal, sciatic and pudendal region. Certain neurological conditions caused by nerve disorders of the spine and peripheral nerves are also aggravated by prolonged sitting. Most prominent of the affected nerves is the sciatic nerve—the largest of all nerves which has an approximate thickness of an adult human thumb and which serves as the major signal pathway that controls the lower extremities. The sciatic nerve runs under or through the piriformis muscle, a small muscle located deep in the buttock, behind the gluteus maximus and just beside the sit bone (ischial tuberosity). This is why this condition is called piriformis syndrome or sciatica. Aside from the sciatic nerve, the other nerves in this same area of the butt which could be affected by excessive sitting are the superior gluteal, inferior gluteal, inferior cluneal, pudendal, superior cluneal, and posterior femoral cutaneous. Another cause of pain near the area is caused by the compression of the tailbone (also called coccydynia).

The symptoms of sciatica and piriformis syndrome varies from patient to patient depending on the degree of the compression or irritation of these nerves and depending on the slight biological differences of each person. Most common of the symptoms related to this condition are pain, numbness, neuropathy, an uncomfortable sensation of pins and needles, sensitivity and weakness of the back, butt, calf, hamstring, ankle and foot and may sometimes include bladder control impairment. This problem is even more common with individuals as they approach late age due to the gradual loss of supporting muscle mass in the buttocks which somehow protect this nerve.

With over 70% of a person's weight concentrated in a relative small area of the butt while sitting, and modern activities that require prolonged sitting in a quite firm seats, it is apparent that more of these nerve compressions and irritations would happen and thus many alternative solutions have been developed to try and solve it.

Some of the currently available variants of cushions or seat pads in the market which aim to reduce pressure to the tailbone and provide relief of pain and pressure to different nerves as mentioned are those that use a singular soft pad made from foam, gel or honeycomb soft resin. However, these are generally not suitable for persons afflicted with neurological painful conditions namely sciatica, ischial bursitis, pirifomis syndrome, coccydynia and nerve impairments in the perineum area because they do not result in a significant improvement in one's sitting experience. These said cushion seats (with a soft top) just offer a softer seat area but are virtually ineffective in changing the pressure points on the buttocks. These type of cushions only offer minimal relief to pain and a negligible added comfort to sitting.

Other available cushions or seat pads only address the pain and discomfort caused by the compression of the tailbone through its design with an opening at the center-rear area of the cushion. While this design can somehow alleviate the pain for people who have coccydynia, the greater case of people who have pain due to compressed sciatic nerve do not benefit from them.

The need to redistribute weight away from the sit bone (and sciatic nerve) is necessary to alleviate pain caused of most sufferers of piriformis syndrome and sciatica. Some cushion designs have elevated side pads which aim to transfer load to the side of the legs. But due to the cushion's fixed design and lack of firmness, this cushion alternative offers a minimal and temporary alleviation of pain since users vary not just in weight and fit preferences but each one has a different appreciation and tolerance to the fixed features of the cushion.

SUMMARY OF THE INVENTION

The primary object of the present invention therefore is to provide an adjustable orthopedic seat pad which is a seat cushion mounted on a seat or the like to alleviate pain experienced by persons afflicted with neurological painful conditions namely sciatica, ischial bursitis, pirifomis syndrome, coccydynia and nerve impairments in the perineum area.

Another object of this invention is to provide an adjustable orthopedic seat pad having a pair of opposing cushion pads and connected by straps which provide the user with the flexibility to adjust the two opposing pads according to the user's desired comfort level.

Still an object of this invention is to provide an adjustable orthopedic seat pad wherein said pair of opposing cushion pads are each provided with raised portion along the top outer edge thereof such that majority of the users' weight is shifted along the outer portions of the user's buttocks and thighs when seating thereon.

Yet another object of this invention is to provide an adjustable orthopedic seat pad wherein the spacing between the rear portions of the opposing pads can be variably adjusted by the user to avoid irritation of the perineum nerves and to also specifically align the raised portion with the intention of lifting and transferring load to the hips (greater trochanter of the femur) from the sit bone (ischial tuberosity) and tail bone (coccyx) of the user.

A further object of this invention is to provide an adjustable orthopedic seat pad wherein said pair of opposing pads are foldable and may have a wrapping closure, zipper and/or carrying handles to facilitate the portable use thereof.

Another object of this invention is to provide an adjustable orthopedic seat pad having a pair of opposing cushion pads having a non-slip material at the bottom portions of the pads with the purpose of preventing slippage.

Yet, an object of this invention is to provide an adjustable orthopedic seat pad that can easily be installed and manufactured using locally available materials and equipment.

These and other objects and advantages will come to view and be understood upon a reading of the detailed description in conjunction with the accompanying drawings thereof.

DETAILED DESCRIPTION

Figure 1:
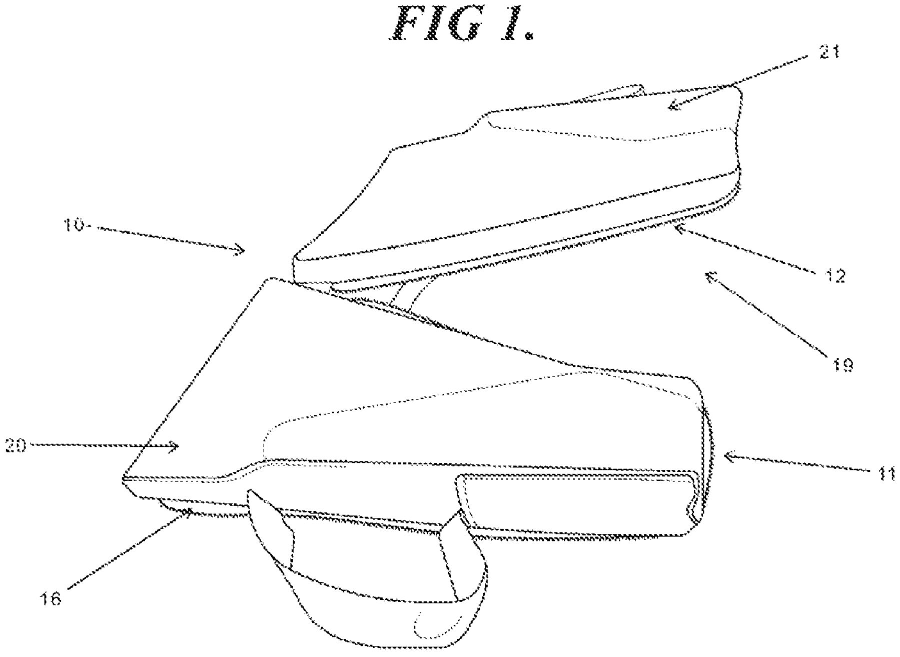
FIG. 1 is a perspective view of the adjustable orthopedic seat pad according to the present invention.

With reference to the several views of the drawings, wherein like reference numerals designates same parts throughout, shown is the present invention for an adjustable orthopedic seat pad is generally designated a reference numeral 10.

Figure 3:
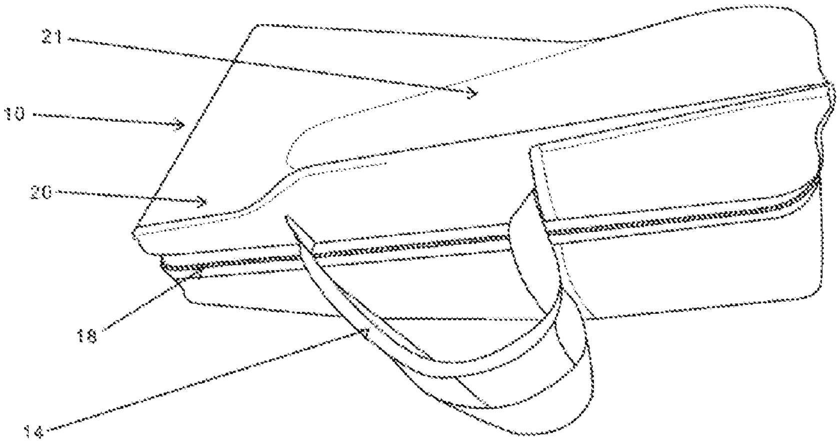
FIG. 3 is a perspective view of the adjustable orthopedic seat pad in the folded mode according to the present invention.
Figure 4:
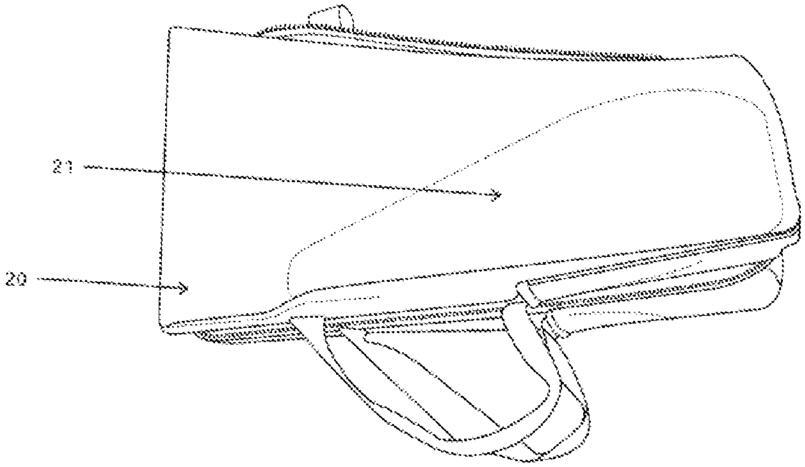
FIG. 4 is a top view of FIG. 3.

Said adjustable orthopedic seat pad 10 comprises a pair of opposing generally rectangular shaped cushion pads 11 and 12, to ensure that said cushion pads 11 and 12 will not be separated from each other, and a plurality of elastic straps 13 spacedly connecting the adjacent portions of said pair of opposing rectangular shaped cushion pads 11 and 12. As shown in the drawings particularly in FIGS. 3 and 4, said rectangular shaped cushion pads 11 and 12 are foldable and a pair of opposing U-shaped handle straps 14 and 15 are being provided at the outer opposing sides 16 of each of said rectangular shaped cushion pads 11 and 12, for purposes of carrying said adjustable orthopedic seat pad 10 by the user anywhere to sit on for long hours while driving a car, in the office, during business meetings or while dining in a restaurant.

To be more portable and to facilitate carrying of said adjustable orthopedic seat pad 10, the periphery portions 17 of each of said opposing rectangular shaped cushion pads 11 and 12 are provided with fastening means 18 such as slide fasteners and the like. This ensures that said cushion pads 11 and 12 will not be swinging against each other while being carried by the user. Another option, however, is by the use of several straps (not shown) with Velcro provided along the periphery of said pair of cushion pads 11 and 12.

Figure 2:
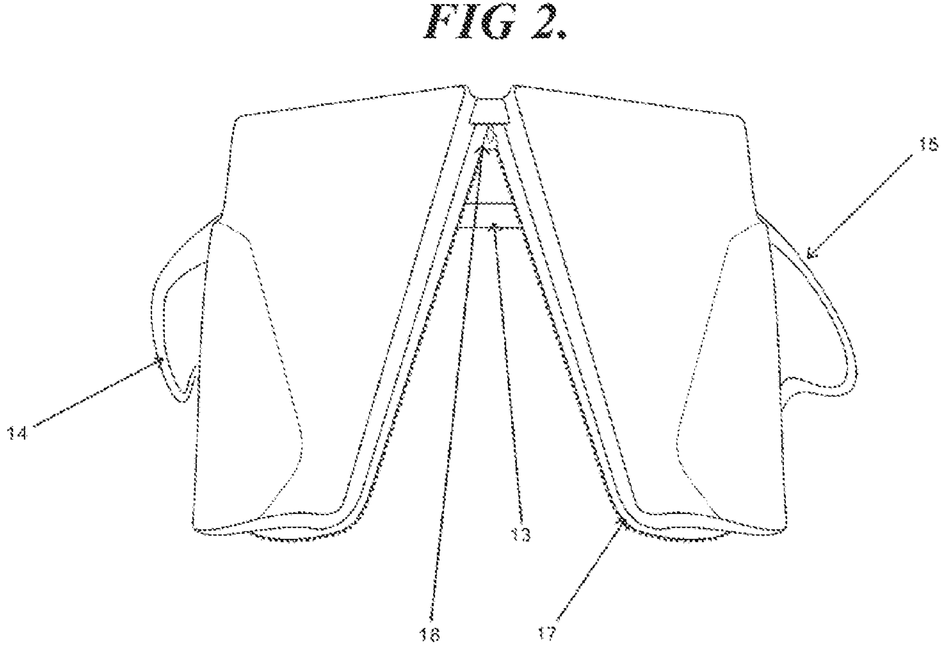
FIG. 2 is a top view of said invention for an adjustable orthopedic seat pad.

When in use and laid on top of a seat or chair (not shown), as shown in FIGS. 1 and 2, the rear end portions 18 of said cushion pads 11 and 12 create a space 19 in between. Said space 19 is intended for positioning and adjusting the tail bone portion of the user when sitting thereon according to the user's preference and maximum comfort. This space 19 eliminates the pressure being usually applied to the tail bone portion of the user during sitting, thus, allowing the user to sit even on a long period of time without feeling any backpains or any pain relative thereto.

Said pair of cushion pads 11 and 12 can be made from foam, contained air, gel, fiber, textile or any combination thereof with varying softness and hardness. The top distal end 20 (i.e. top surface) of each of said cushion pads 11 and 12 are provided longitudinally with elongated raised portions 21 of predetermined thickness. These elongated raised 15 portions 21 allow most of the weight of the user being applied to the adjustable orthopedic seat pad 10 to shift on said elongated raised portions 21 of said cushion pads 11 and 12. The sciatic nerves that runs from the butt area and through the inward portions of thighs and legs thereof, will no longer be subjected to the usual heavy pressure caused by the weight of the users when the thighs are pressed against the 20 seat thereof. The redistribution of weight away from the sit bone (and sciatic nerve) is necessary to alleviate pain caused of prolonged sitting to most sufferers of neurological painful conditions namely sciatica, ischial bursitis, pirifomis syndrome, coccydynia and nerve impairments in the perineum. The shape and/or thickness of the elongated raised portions 21 varies depending on the preference of the user or on the firmness of the material used for the cushion pads 11 and 12. A softer material used in said cushion pads 11 and 12 may require and thicker elongated raised portion 21, while the thickness required of a firmer material would likely to be lesser.

Figure 5:
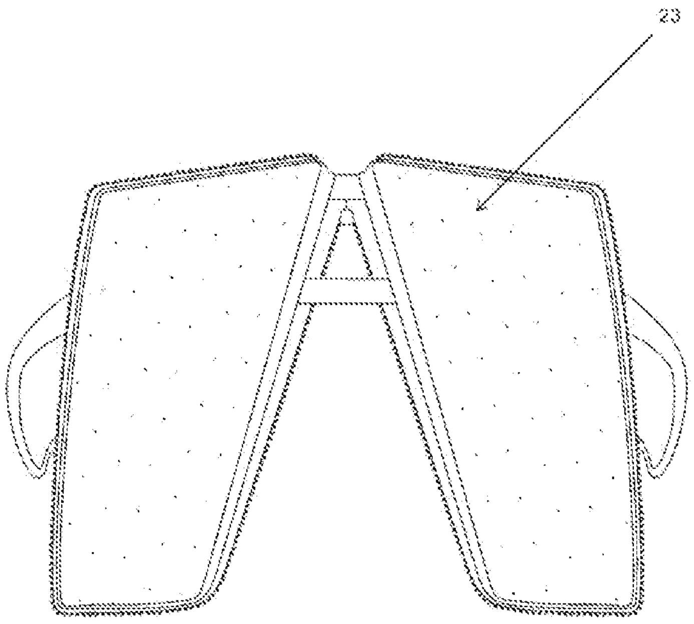
FIG. 5 is a bottom view of the said invention showing the non-slip sheets thereof.

As shown in FIG. 5, the inner opposing sides 22 of each of said cushion pads 11 and 12 are being provided with non-slip sheets 23 to prevent the adjustable orthopedic pad 10 from slippage when placed on top a chair and the like (not shown) when the user sits on it. The non-slip sheet 23 may be made of rubber or rubberized fabric adhered to said inner opposing sides 22.

In view of the present invention for an adjustable orthopedic seat pad 10 as described herein above would actually eliminate the problems of persons afflicted with neurological painful conditions namely sciatica, ischial bursitis, pirifomis syndrome, coccydynia and nerve impairments in the perineum area, when sitting on conventional seats. The present invention for an adjustable orthopedic cushion seat 10 as described herein above would now allow these people to sit longer on any cushion seats, without suffering from pain brought about by the above mentioned neurological conditions.

The invention claimed is:

1. An adjustable orthopedic seat pad for a user afflicted with neurological painful conditions namely sciatica, ischial bursitis, pirifomis syndrome, coccydynia and nerve impairments in the perineum area, said orthopedic seat pad comprising:

a pair of opposing cushion pads, each of said cushion pads having a top surface, an inner opposing side, a rear portion, a front portion opposite said rear portion, an outer edge, and an inner edge opposite said outer edge;

a plurality of elastic straps spacedly connecting said pair of cushion pads; and a space being provided in between the rear portions of said pair of cushion pads to prevent compression on a tailbone of the user during sitting on the seat pad;

wherein each of said pair of cushion pads being provided with an elongated, continuous, raised portion with a predetermined thickness that is thicker than the remaining cushion pad across the top surface, said elongated raised portion disposed longitudinally on the top surface along the outer edge extending from the rear portion towards, but does not reach, the front portion, and extending from the outer edge towards, but does not reach, the inner edge, whereby most of the weight of the user is adapted to apply on said elongated raised portions of said cushion pads.

2. The adjustable orthopedic seat pad according to claim 1 wherein said cushion pads are foldably secured by fastening means which are provided along a peripheral side of each cushion pad, and a handle is attached to each cushion pad adjacent said outer edge for carrying purposes.

3. The adjustable orthopedic seat pad according to claim 2 wherein said fastening means is a slide fastener.

4. The adjustable orthopedic seat pad according to claim 1 wherein the positioning of said rear portions of said pair of cushion pads with respect to each other are adjustable in view of the plurality of elastic straps provided thereof.

5. The adjustable orthopedic seat pad according to claim 2, wherein said pair of cushion pad is provided with non-slip sheets disposed on the inner opposing sides thereof to prevent slippage of said cushion pads when in use.

6. The adjustable orthopedic seat pad according to claim 5 wherein said non-slip sheet is made of rubberized fabric.

7. The adjustable orthopedic seat pad according to claim 1, wherein said plurality of elastic straps comprises a first elastic strap closer to the front portions of the cushion pads and a second elastic strap closer to the rear portions of the cushion pads, said first elastic strap is shorter than said second elastic strap such that said pair of opposing cushion pads are positioned closer to each other at the front portions than at the rear portions.

* * * * *